US008403470B2

(12) United States Patent
Smith et al.

(10) Patent No.: US 8,403,470 B2
(45) Date of Patent: Mar. 26, 2013

(54) SOLID INK MELTER ASSEMBLY

(75) Inventors: Nathan Eymard Smith, Hamlin, NY (US); Roger Leighton, Hilton, NY (US); Michael Fredrick Leo, Penfield, NY (US); Robert Tuchrelo, Williamson, NY (US); Patrick James Walker, Rochester, NY (US); David Peter Lomenzo, Pittsford, NY (US)

(73) Assignee: Xerox Corporation, Norwalk, CT (US)

( * ) Notice: Subject to any disclaimer, the term of this patent is extended or adjusted under 35 U.S.C. 154(b) by 0 days.

(21) Appl. No.: 13/488,567

(22) Filed: Jun. 5, 2012

(65) Prior Publication Data

US 2012/0236093 A1 Sep. 20, 2012

Related U.S. Application Data

(62) Division of application No. 12/638,863, filed on Dec. 15, 2009, now Pat. No. 8,240,829.

(51) Int. Cl.
*B41J 2/175* (2006.01)
*G01D 11/00* (2006.01)

(52) U.S. Cl. ................. 347/88; 347/84; 347/85; 347/99

(58) Field of Classification Search .................... 347/84, 347/88, 99, 85
See application file for complete search history.

(56) References Cited

U.S. PATENT DOCUMENTS

| | | | |
|---|---|---|---|
| 4,771,920 | A | 9/1988 | Boccagno et al. |
| 5,657,904 | A | 8/1997 | Frates et al. |
| 6,175,101 | B1 | 1/2001 | Miller et al. |
| 6,601,950 | B2 | 8/2003 | Hollands et al. |
| 6,746,113 | B1 | 6/2004 | Leighton et al. |
| 6,905,201 | B2 | 6/2005 | Leighton |
| 7,011,399 | B2 | 3/2006 | Godil et al. |
| 7,210,773 | B2 | 5/2007 | Jones |
| 7,581,827 | B2 | 9/2009 | Platt et al. |
| 7,604,336 | B2 | 10/2009 | Leighton |
| 7,828,424 | B2 | 11/2010 | Jones et al. |
| 8,079,696 | B2 | 12/2011 | Leighton |
| 8,096,648 | B2 | 1/2012 | Jones |
| 2004/0114007 | A1 | 6/2004 | Leighton |
| 2004/0114010 | A1 | 6/2004 | Leighton |
| 2005/0146546 | A1 | 7/2005 | Godil et al. |
| 2006/0227193 | A1 | 10/2006 | Leighton |
| 2011/0141212 | A1 | 6/2011 | Smith et al. |
| 2011/0180526 | A1 | 7/2011 | Wayman et al. |

*Primary Examiner* — Matthew Luu
*Assistant Examiner* — Rut Patel
(74) *Attorney, Agent, or Firm* — Maginot, Moore & Beck, LLP

(57) ABSTRACT

A solid phase change ink melter assembly in a phase change ink image producing machine includes an array of a plurality of spaced apart fins, the array defining a top face for receiving the solid pieces of phase change ink, a bottom face for discharging melted ink, and opposite melter surfaces for melting the solid pieces in contact therewith. The assembly further includes a number of heat transfer devices extending through and in heat transfer contact with the plurality of fins, the heat transfer devices including a heating element for heating the device. The bottom edge of the fins defines a plurality of apexes which serve as drip points for molten phase change ink.

20 Claims, 6 Drawing Sheets

SOLID INK MELTER ASSEMBLY

REFERENCE TO RELATED APPLICATION

This application is a divisional application of and claims priority to co-pending application Ser. No. 12/638,863, filed on Dec. 15, 2009, and assigned to the assignee of the present application.

TECHNICAL FIELD

The present disclosure relates generally to image producing machines, and more particularly to a solid phase change ink melter assembly and an image producing machine or printer including such an assembly

BACKGROUND

The present disclosure relates generally to image producing machines, and more particularly to a solid phase change ink melter assembly and an image producing machine or printer including such an assembly.

In general, phase change ink image producing machines or printers employ phase change inks that are in a solid phase at ambient temperature, but exist in the molten or melted liquid phase (and can be ejected as drops or jets) at an elevated operating temperature of the machine or printer. At such an elevated operating temperature, droplets or jets of the molten or liquid phase change ink are ejected from a printhead device of the printer onto a printing media. Such ejection can be directly onto a final image receiving substrate, or indirectly onto an imaging member before transfer from it to the final image receiving media. In any case, when the ink droplets contact the surface of the printing media, they quickly solidify to create an image in the form of a predetermined pattern of solidified ink drops.

An example of such a phase change ink image producing machine or printer, and the process for producing images therewith onto image receiving sheets is disclosed in U.S. Pat. No. 6,905,201, issued on Jun. 14, 2005. The '201 Patent discloses an image producing machine, such as the high-speed phase change ink image producing machine or printer 10 shown in FIG. 1 herewith. As illustrated, the machine 10 includes an imaging member 12, shown in the form of a drum, having an imaging surface 14 that is movable in the direction 16, and on which phase change ink images are formed.

The image producing machine 10 also includes a phase change ink delivery subsystem 20 that has at least one source 22 of one-color phase change ink in solid form. For a multi-color image producing machine, the ink delivery system 20 may include several sources, such as four sources 22, 24, 26, 28, representing four different colors CYMK (cyan, yellow, magenta, black) of phase change inks. The ink delivery system also includes a melting and control apparatus 300 (FIG. 2) for melting or phase changing the solid form of the phase ink into a liquid form, and then supplying the liquid form to a printhead system 30 including at least one printhead assembly 32. Since the phase change ink image producing machine 10 is a high-speed, or high throughput, multicolor image producing machine, the printhead system includes four separate printhead assemblies 32, 34, 36 and 38 receiving molten ink from a corresponding source 22, 24, 26 and 28.

As further shown, the machine 10 includes a substrate supply and handling system 40. Operation and control of the various subsystems, components and functions of the machine or printer 10 are performed with the aid of a controller or electronic control subsystem (ESS) 80. Details of these systems and subsystems can be obtained from the '201 Patent. In operation, image data for an image to be produced is sent to the controller 80, such as from a scanning system 70, for processing and output to the printhead assemblies 32, 34, 36, 38. Appropriate color solid forms of phase change ink are melted and delivered to the printhead assemblies to form the image on the surface 14.

The '201 Patent discloses a number of melter assemblies 300, as shown in FIG. 2 that includes a housing 302 with walls 304 defining a melting chamber 306. Each melter assembly 300 also includes a positive temperature coefficient (PTC) heating device 310 that is mounted within the melting chamber 306 for heating and melting solid pieces of phase change solid ink. Each housing 302 may include a screen device 314 that is mounted below the PTC heating device 310 for removing unwanted particles from the melted molten liquid ink coming from the heating device 310.

The PTC heating device 310 disclosed in the '201 Patent includes a frame made of a conductive material such as aluminum, and a pair of folded fins 326, 328 that are also made of a conductive material such as aluminum. The folded fins 326, 328 act as a heating element for providing the heat and melting surface area that contact and melt the solid pieces phase change ink. A pair of electrodes connected the folded fins 322, 324 to an electrical supply. The folded fins define a series of channels between fin folds 332 that increase the heated surface area and therefore maximize the efficiency of the PTC heating device 310. The molten liquid ink drops gravitationally from the folded fins and through the channels to the molten liquid ink storage and control assembly 400 located below the melter assembly 300, as shown in FIG. 2.

As disclosed herein, the phase change ink printing process includes raising the temperature of a solid form of the phase change ink to melt the ink and form a molten liquid phase change ink. Conventionally, the solid form of the phase change is a "stick", "block", "bar" or "pellet" that is fed into a heated melting device, such as the device disclosed in the '201 Patent. Due to the requirement for the phase change of the ink, image producing machines or printers of this type are considered to be low throughput, typically producing at a rate of less than 30 prints per minute (PPM). The throughput rate (PPM) of a phase change ink image producing machine is directly dependent on how quickly the "stick", "block", "bar" or "pellet" form can be melted down into a liquid.

There a prevailing need for higher throughput for phase change ink image producing machines or printers particularly color images on plain paper substrates.

SUMMARY

A solid ink melter apparatus comprises an array of a plurality of spaced apart fins, with a number of heat transfer elements passing through the plurality of fins. Solid ink pellets are disposed on a top face of the array and melted by the fins when the fin array is heated by the heat transfer elements. In one embodiment, the fins are in the form of substantially flat plates with the top edges thereof defining the top face of the array. The opposite bottom edge of the fins are configured to define a number of drip points. In one embodiment, the drip points are in the form of a triangular apex so that solid ink that melts on the melting surfaces of the fins will follow the bottom edge of the fins to the number of drip points.

A solid phase change ink melter assembly in a phase change ink image producing machine comprises an array of a plurality of spaced apart fins, the array defining a top face for receiving the solid pieces of phase change ink, a bottom face for discharging melted ink, and opposite melter surfaces for melting the solid pieces in contact therewith. The assembly further comprises a number of heat transfer devices extending through and in heat transfer contact with the plurality of fins, the heat transfer devices including a heating element for heating the device. In one embodiment, the fins are in the form of substantially flat parallel plates spaced apart a distance approximately equal to a maximum dimension of the solid pieces of phase change ink. The bottom edge of the fins may define a plurality of apexes which serve as drip points for the molten phase change ink.

In another embodiment, a phase change ink image producing machine comprises:

(a) a control subsystem for controlling operation of all subsystems and components of the image producing machine;

(b) a movable imaging member having an imaging surface;

(c) a printhead system connected to the control subsystem for ejecting drops of melted molten liquid phase change ink onto the imaging surface to form an image;

(d) at least one ink supply for supplying solid pieces of phase change ink to be heated and melted; and (e) a melter assembly associated with the at least one ink supply for heating and melting the solid pieces of phase change ink into melted molten liquid ink, the melter assembly including;

an array of a plurality of spaced apart fins, the array defining a top face for receiving the solid pieces of phase change ink, a bottom face for discharging melted ink, and opposite melter surfaces for melting the solid pieces in contact therewith; and a number of heat transfer devices extending through and in heat transfer contact with the plurality of fins, the heat transfer devices including a heating element for heating the device.

BRIEF DESCRIPTION OF THE DRAWINGS

In the detailed description presented below, reference is made to the drawings, in which.

DETAILED DESCRIPTION

Figure 1:
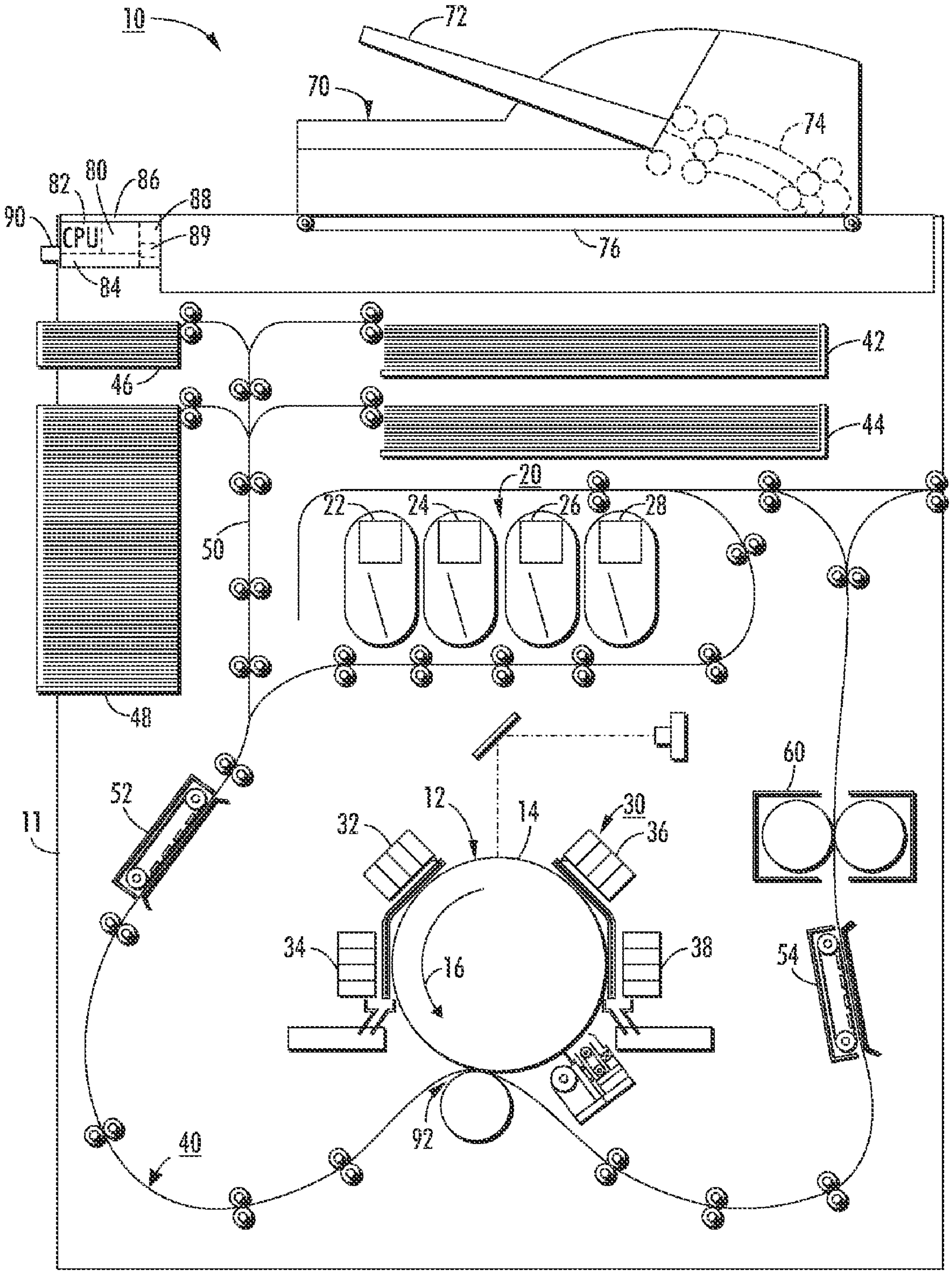
FIG. 1 is a vertical schematic of a high-speed phase change ink image producing machine or printer that may incorporate the solid phase change ink melter assembly disclosed herein.
Figure 2:
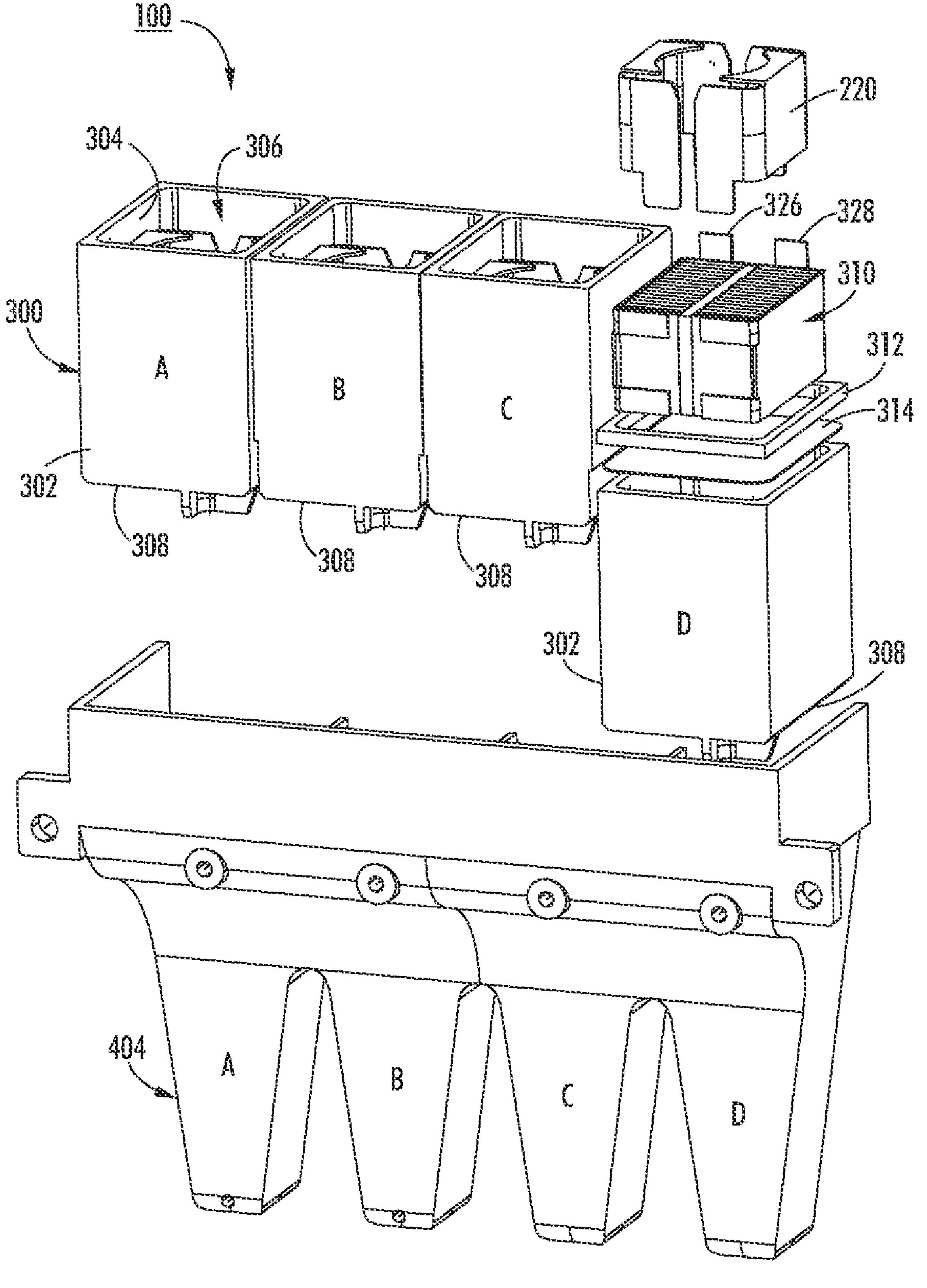
FIG. 2 is a perspective, partially exploded view of a solid phase change ink melter assembly of the prior art, as represented by U.S. Pat. No. 6,905,201.
Figure 3:
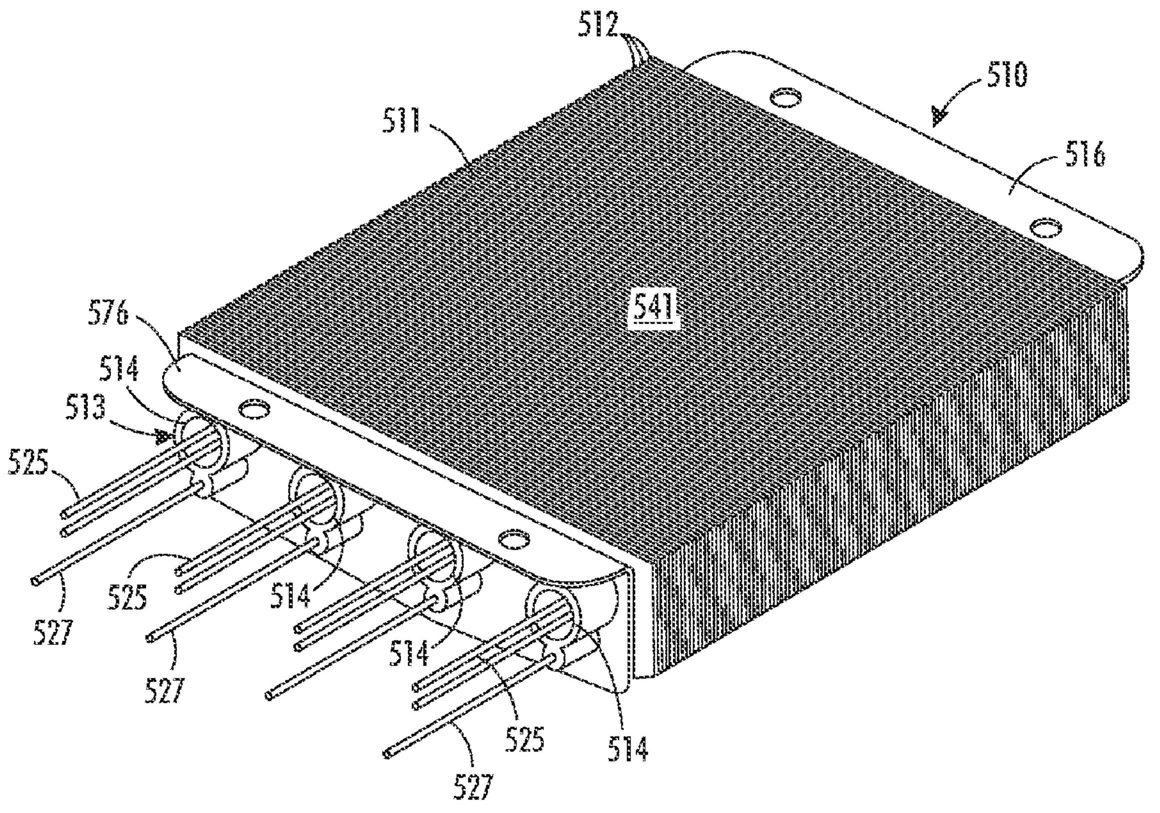
FIG. 3 is a front perspective view of a solid ink melter apparatus according to one embodiment disclosed herein.
Figure 4:
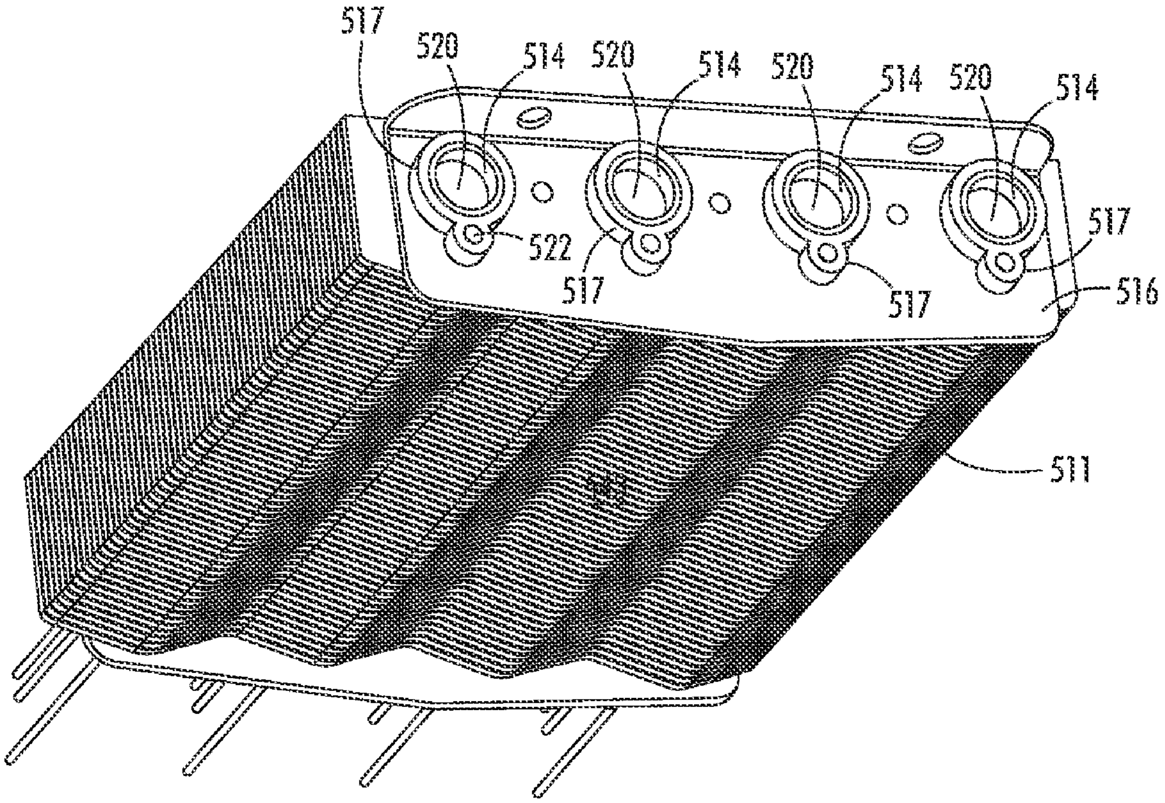
FIG. 4 is a rear view of the solid ink melter apparatus shown in FIG. 3.
Figure 5:
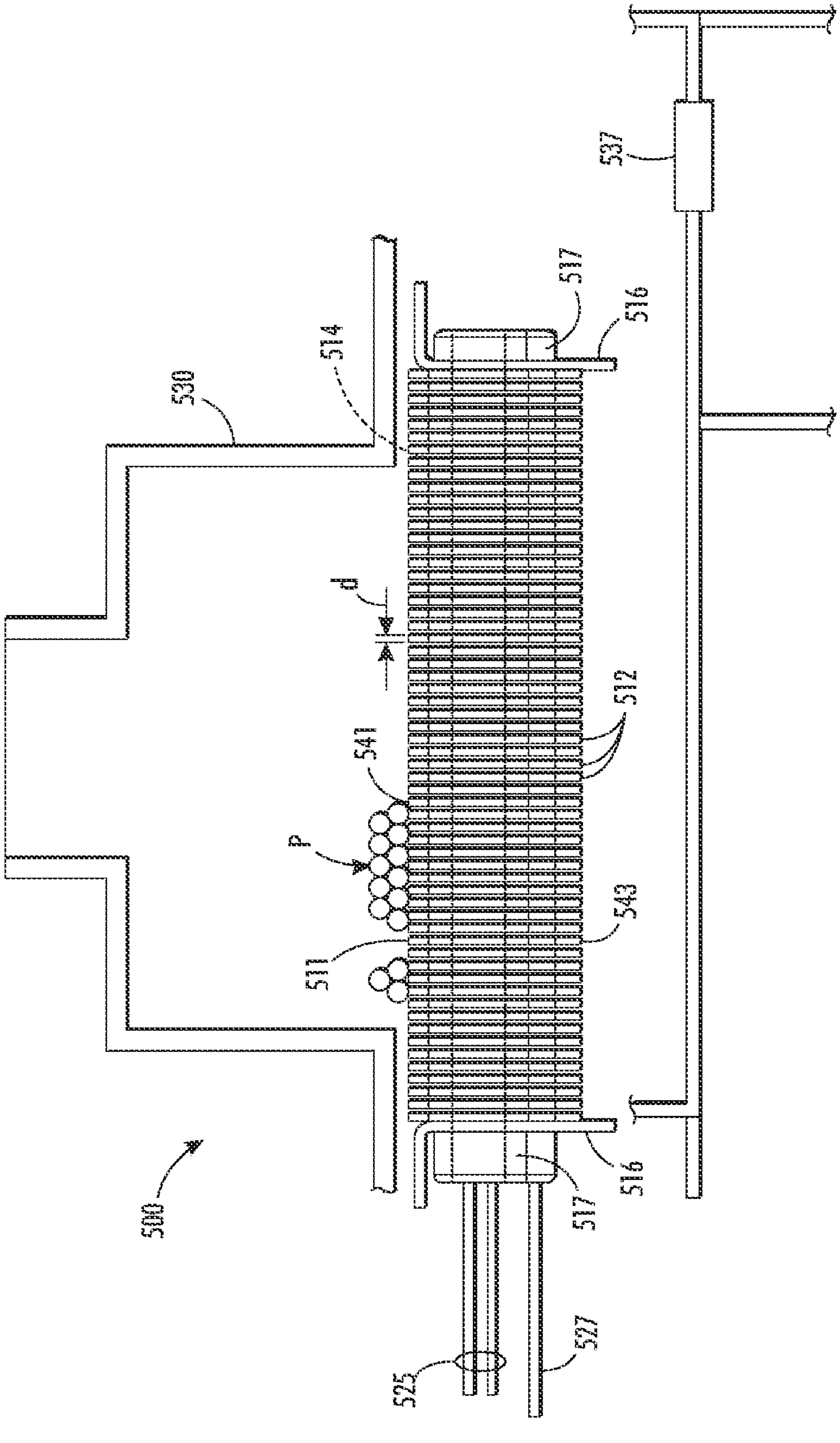
FIG. 5 is a side view of the solid ink melter apparatus shown in FIG. 3 mounted within one embodiment of a solid ink melter assembly.

In one embodiment, a sold ink melter system 500 (FIG. 5) includes a solid or phase-change ink melter apparatus 510. As shown in FIGS. 3-5, the melter apparatus includes an array 511 of a plurality of spaced apart fins 512. A number of heat transfer devices 513 pass through the array of fins 512. The heat transfer devices are in heat transfer contact with the fins so that when the assemblies are heated the heat is conveyed to the fins.

Figure 6:
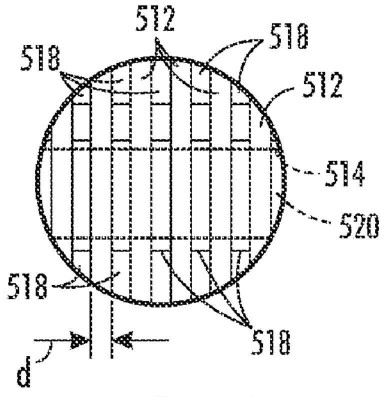
FIG. 6 is an enlarged top view of a portion of the solid ink melter apparatus shown in FIG. 3.

The array 511 of fins 512 defines a top face 541 onto which a supply of solid ink pellets P rests, as shown in FIG. 5. The pellets may be introduced to and contained on the top face by a feed hopper 530 of the solid ink melter system 500. In one embodiment, the fins 512 are spaced apart by a gap distance d (FIG. 6) that is at least equal to an outer dimension of an individual pellet. For instance, in one specific embodiment, the pellets P may be generally spherical with a diameter of 0.9±0.3 mm. The gap distance d is at least equal to the maximum dimension or the largest pellet diameter of 1.2 mm so that all the pellets are able to pass between the heated fins. In one embodiment, the gap distance d is equal to or only slightly greater than the maximum dimension of the pellets P. The gap distance may be optimized in relation to the pellet size to achieve a predetermined melt flow rate. For instance, the gap distance may be calibrated to the pellet size to achieve a melt flow rate of 210 g/min. to maintain print speed at 28% coverage.

Figure 7:
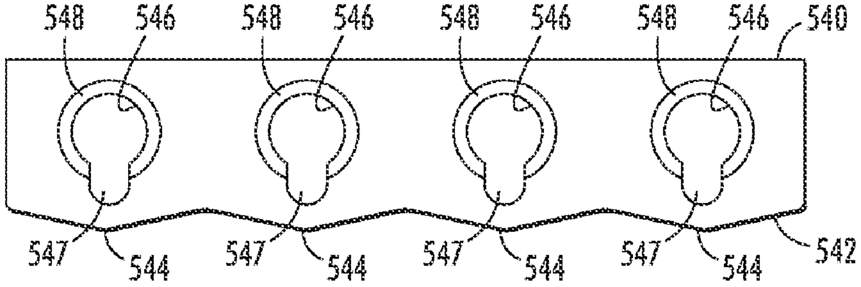
FIG. 7 is a front view of a fin incorporated into the solid ink melter apparatus shown in FIG. 3.
Figure 8:
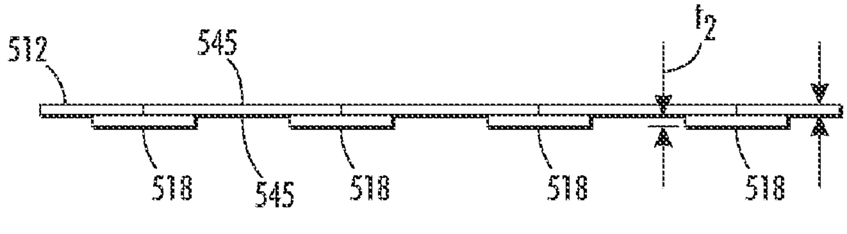
FIG. 8 is a bottom view of the fin shown in FIG. 7.

As shown in FIGS. 7-8, each fin 512 is in the form of a substantially flat and generally rectangular plate. The top edge 540 of the plate is substantially flat while the bottom edge 542 defines a number of drip points 544. As shown in FIG. 7, these drip points are substantially triangular forming an apex. When the solid ink pellets are introduced into the fin array 511, the pellets fall between the spaced-apart fins and contact the front and back melter surfaces 545 of the plates. When the ink melts on the surfaces, gravity forces the melted ink to flow toward the bottom edge 542. Surface tension causes the dripping ink to follow the bottom edge to one of the apexes or drip points. When enough melted ink collects at the drip point, ink drops are formed which eventually drop into a melted ink reservoir 535 underneath the bottom face 543 of the melter apparatus 510. The melted ink is then fed by a valve array 537 to the printheads in a conventional manner.

The fin plates define a number of openings to receive a corresponding number of heat transfer devices 513. The devices 513 are operable to heat the fins in the fin array to thereby increase the temperature of the melter surfaces 545 sufficient to melt the solid ink pellets. As shown in FIGS. 3-5, four such heat transfer devices are provided. Each device 513 includes a tubular body 514 that extends through the fin array. Mounting plates 516 flank the fin array and include mounting flanges 517 for engaging and supporting the tubular body 514. In one embodiment, the tubular body 514 defines a heater bore 520 and a sensor bore 522 extending parallel to and beneath the heater bore. The heater bore 520 is configured to receive a heating element 525 that may be in the form of a closed-loop controlled heating cartridge or thermistor. When the element is energized it generates heat that is conducted to the heater tube 520. This heat is then transferred to the fins to heat the melter surfaces 545.

The sensor bore 522 is configured to receive a temperature sensor 527, such as a thermocouple. In one embodiment, the sensor bore 522 is integral or in direct communication with the heater bore 520 so that the sensor can provide an accurate measure of the temperature within the heater bore. The temperature sensor 527 is integrated into the closed-loop control for the heating element 525, which may be a PID (proportional integral derivative) controller (not shown). The heating element 525 and sensor 527 are configured to maintain a temperature suitable for optimal melting of the solid ink pellets. In one embodiment, this heating element is controlled to a temperature of about 120° C. For certain inks, the melting temperature should not exceed a predetermined value, such as about 135° C., which might cause discoloration of the melted ink. The controller can be calibrated to maintain the desired temperature and to not exceed the maximum allowable temperature.

The heat transfer device 513 relies upon intimate contact between the heated tubular body 514 and the fins 512. Thus, the fin plates define a plurality of openings corresponding to the configuration of the tubular body 514. Thus, the plates define a first portion or heating tube opening 546 and a contiguous second portion or sensor tube opening 547, as shown in FIG. 7. The openings are sized for a press fit between the tubular body and the fins. The openings 546 and 547 may be circular to correspond to a circular tubular shape of the tubular body 514.

In order to maintain the optimum spacing between fins as the fins are assembled or stacked onto the plurality of heat transfer devices, the fins are provided with corresponding spacers 518 affixed to the fins 512. The spacers 518 follow the perimeter of the heating tube opening, as shown in FIG. 7. In the illustrated embodiment, the spacers do not extend around the perimeter of the sensor tube opening 547 due to the proximity of the opening to the drip points 544.

In one embodiment, the fins 512 and tubular bodies 513 are formed of aluminum for optimum heat transfer. The spacers 518 may also be formed of a heat transfer material, such as aluminum to avoid "cold spots" within the fin array 511. The spacers 518 may be bonded to a surface 545 of the fin plate in a conventional manner capable of withstanding the operating temperatures of the solid ink melter apparatus 510. The fins have a thickness $t_1$ of about 1 mm, while the spacers have a thickness $t_2$ of about 1.2 mm. The thickness of the spacers is dictated by the desired gap dimension d, as described above.

The fin array 512 of the apparatus 510 provides an extremely large melter surface area in a small package. In one embodiment, the fins are about 120 mm long and about 25 mm wide so that the entire fin array and solid ink melter apparatus 510 can fit within a 125×125 mm area. The fin watt density of the illustrated embodiment is about 3 watt/in$^2$. Each heat transfer device 513 can develop about 52 watt/in$^2$. In one embodiment, the fin array 511 includes 62 fins pressed onto four heat transfer devices 513. This configuration is capable of generating 1800 total watts to achieve a melted ink flow rate of about 220 grams/minute.

It is contemplated that the size of the fin array can be adjusted in relation to space constraints, solid ink melting characteristics and desired flow rates. This, in some embodiments the fin array may require less or more than 62 fins. The fin configuration of the apparatus 510 simplifies construction of the apparatus and allows for simple modifications by pressing only the desired number of fins onto the tubular bodies 514. Moreover, although the fins may incorporate four heat transfer devices 513, not all of the assemblies need be incorporated or activated.

In the illustrated embodiment, the heating elements 525 are in direct contact with the tubular bodies 513 so that the bodies are heated by conduction. Thermal grease may be applied between the heating elements and the inside of the tubular bodies to enhance the conduction path.

It will be appreciated that various of the above-described features and functions, as well as other features and functions, or alternatives thereof, may be desirably combined into many other different systems or applications. Various presently unforeseen or unanticipated alternatives, modifications, variations or improvements therein may be subsequently made by those skilled in the art which are also intended to be encompassed by the following claims.

For example, the fin 512 of the fin array 511 described herein are constructed as generally rectangular flat plates; however, the configuration of the plates may vary according to space considerations within the particular printing machine. Thus, the fins may be curved or incorporate a zig-zag configuration, provided the plates in the array are generally parallel with proper spacing. Moreover, the plates within a given array may have different configurations to help ensure a uniform temperature across the surface 541, or more particularly across the portion of the surface onto which the phase change pellets are dispensed.

Likewise, the heat transfer devices 513 may be modified provided they are capable of heating the fin array 511 to a proper melting temperature. Thus, while the heating elements 525 described herein rely upon conduction heat transfer, the heating elements may be configured for convection heat transfer within the interior of the heater bores 520, although this approach may increase the energy requirements to produce the optimum melting temperature at the fins. In still another alternative, the heating elements may be replaced with a hot heat transfer fluid flowing through the heater bores. Other devices capable of increasing the temperature of the melter surfaces of the fin array may be contemplated.

What is claimed is:

1. A solid phase change ink melter assembly for melting solid pieces of a phase change ink into molten liquid ink in an image producing machine, the solid phase change ink melter assembly comprising:

an array of a plurality of spaced apart fins, said array defining a top face for receiving the solid pieces of phase change ink, a bottom face for discharging melted ink, and melter surfaces for melting said solid pieces in contact therewith, wherein at least two fins of said plurality of spaced apart fins are substantially flat plates having a top edge at said top face and a bottom edge at said bottom face, said bottom edge having a plurality of triangular shapes to form a plurality of apexes, each apex providing a drip point for melted ink; and a device for heating said melter surfaces for each fin in said array.

2. The melter assembly of claim 1, further comprising at least one ink supply for supplying solid pieces of phase change ink to said top face.

3. The melter assembly of claim 1, wherein said plurality of fins are spaced apart a predetermined distance that is at least equal to a maximum dimension of the solid pieces.

4. The melter assembly of claim 3, further comprising a number of spacers between adjacent fins, each spacer having a thickness substantially equal to said predetermined distance.

5. The melter assembly of claim 4, wherein said spacers are formed of aluminum.

6. The melter assembly of claim 4, wherein said spacers are affixed to said fins.

7. The melter assembly of claim 1, further comprising a reservoir for collecting molten ink dripping from said at least one apex.

8. The phase change ink image producing machine of claim 1, wherein said device for heating said melter surfaces includes a number of heat transfer devices in heat transfer contact with said plurality of fins, each heat transfer device including a heating element for heating the device.

9. The melter assembly of claim 8, wherein each heat transfer device in said number of heat transfer devices includes a temperature sensor.

10. The melter assembly of claim 8, wherein:

each fin of said plurality of spaced apart fins has at least one opening, each opening in each fin being aligned with one opening in each fin within said array; and each of said number of heat transfer devices extends through a plurality of aligned openings in said plurality of fins.

11. The melter assembly of claim 10, further comprising a number of spacers between adjacent fins, said spacers configured to surround at least a portion of said at least one opening.

12. The melter assembly of claim 11, wherein:

said at least one opening in each fin includes a first portion; and each of said heat transfer devices includes a tubular body having a shape complementary with said first portion of each of said at least one opening in each fin.

13. The melter assembly of claim 12, wherein said heating element is disposed within said tubular body.

14. The melter assembly of claim 13, wherein:

said at least one opening in each fin includes a second portion; and each of said heat transfer devices includes a temperature sensor extending through said second portion of said plurality of aligned openings in said plurality of fins.

15. A solid phase change ink melter assembly for melting solid pieces of a phase change ink into molten liquid ink in an image producing machine, the solid phase change ink melter assembly comprising:

an array of a plurality of spaced apart fins, said array defining a top face for receiving the solid pieces of phase change ink, a bottom face for discharging melted ink, and melter surfaces for melting said solid pieces in contact therewith, wherein each of said fins is a plate defining said melter surfaces and having a top edge at said top face and a bottom edge at said bottom face; and a number of heat transfer devices passing through said plate of each fin and in heat transfer contact therewith, each heat transfer device including a heating element for heating the heat transfer device and thereby heat said fins in heat transfer contact therewith.

16. The phase change ink image producing machine of claim 15, wherein said plurality of fins are spaced apart a predetermined distance that is at least equal to a maximum dimension of the solid pieces.

17. The phase change ink image producing machine of claim 16 further comprising a number of spacers between adjacent fins, each spacer having a thickness substantially equal to said predetermined distance.

18. The phase change ink image producing machine of claim 15, wherein said bottom edge of said plate of each of said fins defines a plurality of triangular shapes to form a plurality of said apexes, each apex providing a drip point for melted ink.

19. The phase change ink image producing machine of claim 15, wherein each heat transfer device includes a tubular body with said heating element extending therethrough.

20. The phase change ink image producing machine of claim 15, wherein said number of heat transfer devices includes at least two devices spaced apart across a width of said plate of said plurality of fins.

* * * * *